(12) United States Patent
Suzuki et al.

(10) Patent No.: US 6,992,861 B2
(45) Date of Patent: Jan. 31, 2006

(54) HEAD SUSPENSION FOR SWING ARM ACTUATOR

(75) Inventors: Atsushi Suzuki, Kawasaki (JP); Ryosuke Koishi, Kobe (JP); Daisuke Mizutani, Kawasaki (JP); Ren Ishikawa, Kawasaki (JP); Masashi Takada, Kawasaki (JP); Yasuhiro Yoneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 10/264,146

(22) Filed: Oct. 3, 2002

(65) Prior Publication Data

US 2003/0156346 A1   Aug. 21, 2003

(30) Foreign Application Priority Data

Feb. 15, 2002   (JP)   ............................. 2002-038041

(51) Int. Cl.
 *G11B 5/48*   (2006.01)
(52) U.S. Cl. ................... 360/244.3; 360/244.4
(58) Field of Classification Search ............. 360/244.3
   See application file for complete search history.

(56) References Cited

U.S. PATENT DOCUMENTS

| | | | | |
|---|---|---|---|---|
| 4,991,045 A | * | 2/1991 | Oberg | 360/244.3 |
| 5,296,983 A | * | 3/1994 | Blanc et al. | 360/244.3 |
| 5,978,178 A | * | 11/1999 | Adley | 360/244.4 |
| 6,271,995 B1 | * | 8/2001 | Fontana et al. | 360/244.3 |
| 2002/0176209 A1 | * | 11/2002 | Schulz et al. | 360/244.3 |

FOREIGN PATENT DOCUMENTS

JP   8-212741   8/1996

* cited by examiner

*Primary Examiner*—A. J. Heinz
(74) *Attorney, Agent, or Firm*—Greer, Burns & Crain, Ltd.

(57) ABSTRACT

The present invention is aimed to provide a head suspension having a high resonant frequency, high shock resistance and low rigidity, which greatly contributes to an improvement of a magnetic disk apparatus. In an oscillation-type actuator, at least a part of a spring arm of the head suspension having a data reading/writing head slider 1 is made of an anisotropic layer whose rigidity varies in accordance with a direction. In this case, the anisotropic layer is laminated so that the high rigidity modulus orientation direction is different according to layer.

14 Claims, 9 Drawing Sheets

| MATERIAL | SUS304 | SUS304 (INCREASE IN THICKNESS) | ANISOTROPIC MATERIAL (CFRP) |
|---|---|---|---|
| RIGIDITY IN UPWARD/DOWNWARD DIRECTION [mN/mm] | 5.5 | 16.1 | 14.6 |
| PITCH [mNmm/rad] | 24 | 26 | 13 |
| ROLL [mNmm/rad] | 45 | 51 | 28 |
| PRIMARY TWIST [kHz] | 4.0 | 5.9 | 11.1 |
| SECONDARY TWIST [kHz] | 12.8 | 15.6 | (19.2) |
| Sway [kHz] | 15.1 | 17.4 | 19.2 |
| EQUIVALENT MASS [mg] | 3.06 | 3.40 | 2.65 |

HEAD SUSPENSION FOR SWING ARM ACTUATOR

CROSS-REFERENCE TO RELATED APPLICATION

This application claims priority, and incorporate by reference the entire disclosure of Japanese Patent Application No. 2002-38041, filed on Feb. 15, 2002.

BACKGROUND OF THE INVENTION

1. Field of the Invention

The present invention relates to a head suspension, and particularly to a structure of a head suspension for supporting a magnetic head to read/write data from and on a magnetic disk in an oscillation-type actuator which is used in a magnetic disk apparatus. The magnetic disk apparatus us used as an external storage device for a computer.

2. Description of the Prior Art

Recently, track pitches have been made smaller to increase the storage capacity in a magnetic disk apparatus, and accordingly, the frequency band to control the position of a magnetic head which moves on tracks has become higher. In control using such a high frequency band, it is necessary for the frequency of the mechanical resonance point of the suspension to be high so as not to make the controlling frequency of the head suspension operate the head at the mechanical resonance frequency of the suspension. Namely, a high resonant frequency head suspension is required.

To enhance the resonante frequency of the head suspension to operate the magnetic head, it has been conventionally proposed to increase the thickness of the head suspension entirely or partially, to welding two plates in order to partially increase the thickness of the head suspension, or to provide ribs on the head suspension. Namely, in the prior art, the frequency of the resonance point is enhanced by increasing a spring constant of the head suspension.

However, such solution in the prior art increases the mass of the whole suspension, thus resulting in an influence on floating of a magnetic head slider which is attached to a tip of the head suspension. Namely, the rigidity of the head suspension in the upward and downward direction is so large that uneven floating takes place, or the mass of the whole suspension is increased, thus leading to a reduce shock resistance. An increase in the mass of the suspension makes large a drive system to drive the head suspension and increases the power consumption thereof.

To solve the problems of the prior art, it has been proposed that two anisotropic fiber-reinforced composite layers are used to connect the head slider of the head suspension and a load beam portion of a support of the head slider (see Japanese Kokai No. 8-212741).

However, in a head suspension structure described in Kokai No. 8-212741 in which the fibers are laminated with the orientations degree intersecting at 90 degrees, no optimization of the laminate structure is obtained. Therefore, the resonance frequency of the head suspension in the seeking direction tends to be lower than that of a conventional head suspension using SUS material. Also, there is a possibility that the rigidity of the head suspension in the upward and downward direction is increased.

SUMMARY OF THE INVENTION

The present invention is aimed to provide a head suspension of a good shock resistance and high resonance which contributes to development of an improved magnetic disk apparatus, in which the head suspension is made of laminated anisotropic material so that the external flexural rigidity is small and the internal flexural rigidity is large, whereby the rigidity of the head suspension, which has an influence on the floating of a head slider, can be reduced.

To achieve the above purpose, the present invention can be embodied in the following first to fifth embodiments.

In a head suspension of an oscillation-type actuator, in a first embodiment, in which a head to read/write data is provided at a tip end of the head suspension, at least a part of the head suspension is made of an anisotropic material whose rigidity varies depending on the direction.

In a head suspension of a second embodiment, the anisotropic material referred to in the first embodiment forms a lamination structure in which the layers have different orientations of the high rigidity are different in layers.

In a head suspension of a third embodiment, a pivot is provided near a head mounting position of the head suspension of the first or the second embodiment to apply pressure to the head toward a recording medium from or on which data is read/written by the head.

In a head suspension of a fourth embodiment, a rigid body is formed on the head suspension in any of first through the third embodiment, by thickening a part of the head suspension more than the other portion thereof.

In a head suspension of a fifth embodiment, the rigid body of the head suspension of the forth embodiment has a thickness larger than that of the remaining portion, by increasing the number of the anisotropic layers to be laminated.

In the head suspension of the above described embodiments, the anisotropic layers are laminated so that the external flexural rigidity of the head suspension is small and the internal flexural rigidity is large. Consequently, for example, if an anisotropic material such as a carbon fiber reinforced plastic (CFRP) is used, a three-layer structure can be obtained in which a layer of a carbon fiber reinforced plastic (CFRP) oriented in the longitudinal direction of the suspension is sandwiched between layers of carbon fiber reinforced plastics (CFRP) oriented in the width direction thereof. Thus, a head suspension having low rigid, high resonance, light and good shock resistance can be designed.

BRIEF DESCRIPTION OF THE DRAWINGS

The present invention will be more clearly understood from the description as set forth below with references to the accompanying drawings, wherein.

DESCRIPTION OF THE PREFERRED EMBODIMENTS

Before describing the preferred embodiments, an explanation will be given of a head actuator using a conventional head suspension shown in FIGS. 1A to 1C.

Figure 1A:
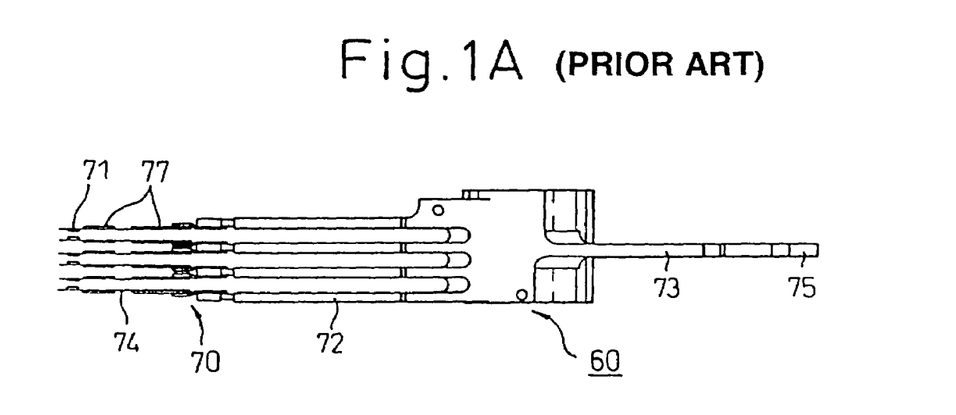
FIG. 1A is a left side view showing a conventional head actuator having a head suspension.
Figure 1B:
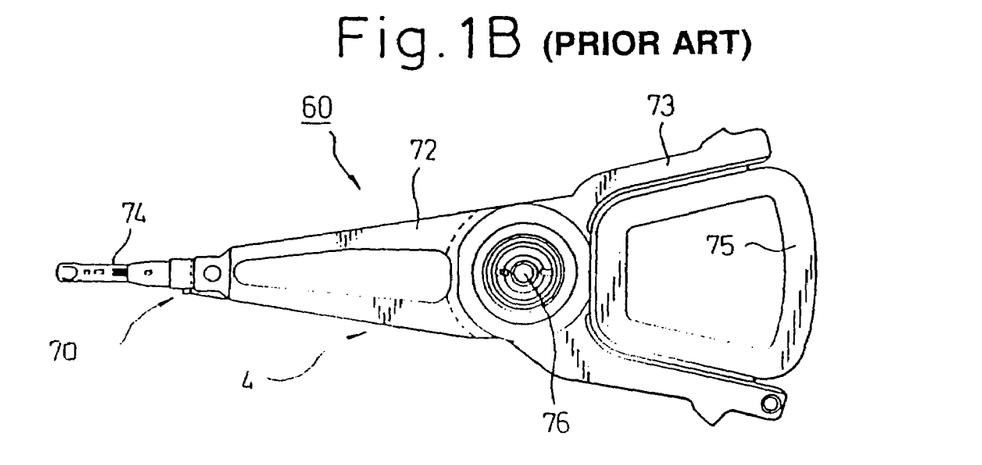
FIG. 1B is a plan view showing a conventional head actuator having a head suspension.
Figure 1C:
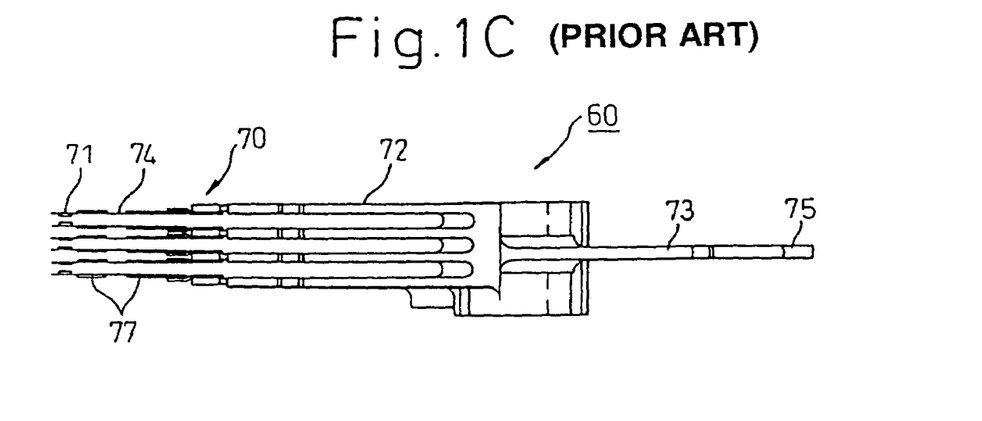
FIG. 1C is a right side view showing a conventional head actuator having a head suspension.

FIGS. 1A through 1C show a structure of a head actuator 60 having a conventional head suspension 74 in a disk apparatus. FIG. 1A is a left side view of the head actuator 60, FIG. 1B is a plan view of the head actuator 60, and FIG. 1C is a right side view of the head actuator 60. The head actuator 60 is attached to a rotation shaft 76, such as a pin, and oscillates about the rotation shaft 76. Carriage arms 72 which are in the form of a comb in side view are provided on one side of the rotation shaft 76. One or two head suspension(s) 74 is(are) attached to the tip end of each carriage arm 72. At the tip ends of the head suspensions 74, head sliders 71 having heads to transmit and receive the data to and from a disk medium are provided.

Two supporting arms 73 are provided on the side opposite to the carriage arm 72 with respect to the rotation shaft 76, and a flat coil 75 is interposed between the supporting arms 73. The flat coil 75 is opposed to a magnetic circuit (not shown) provided on the base side of a disk apparatus, so that the head actuator 60 oscillates according to the value of a current flowing in the flat coil 75.

A base 70 of each head suspension 74 is joined to the tip end of the corresponding carriage arm 72. A head fine movement mechanism may be optionally provided on the joint base 70 of each head suspension 74 to finely move the head suspension 74 independently of the oscillation of the head actuator 60. Ribs 77 are partially provided on the head suspension 74 to enhance the resonance frequency in the conventional head suspension 74.

For these reasons, the mass of the entirety of the conventional head suspension 74 is increased, thus resulting in an advance influence on the floating of the head sliders 71 mounted to the tip ends of the head suspensions 74 or in an increase of the rigidity of the head suspensions 74 in the upward and downward directions, leading to uneven floating.

Figures 2A, 2B, 2C:
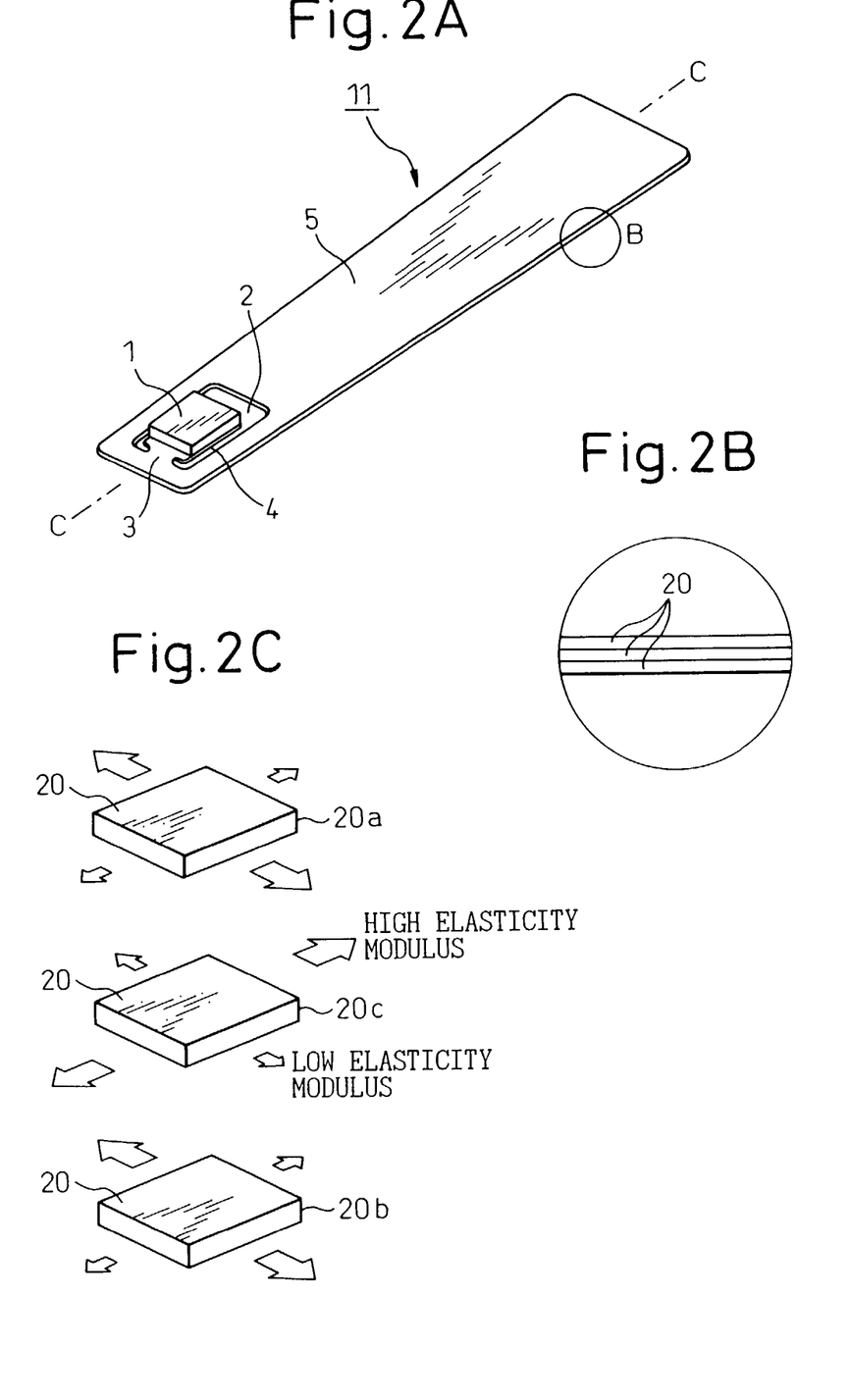
FIG. 2A is a perspective view showing the first embodiment of a head suspension according to the present invention.
FIG. 2B is an enlarged partial view in a part B of FIG. 2A.
FIG. 2C is an exploded perspective view showing orientations of three anisotropic layers laminated as shown in FIG. 2B by way of example.

FIG. 2A shows a head suspension 11 according to a first embodiment of the present invention, which is attached at the same position as the head suspension 74 shown in FIG. 1A through FIG. 1C. A substantially U-shaped hole 2 is provided at the tip end of the spring arm 5 which constitutes the head suspension 11. A hinge 3 and a slider mounting portion 4 are formed in the substantially U-shaped hole 2. A head slider 1 having an inductance head or an MR head is mounted to the slider mounting portion 4.

The spring arm 5 in the first embodiment is comprised of three layers of anisotropic material 20 having different rigidities (elasticity moduli) depending on the direction, as shown in FIG. 2B. Each anisotropic layer 20 exhibits a high elasticity modulus in a direction (represented by thick arrows) and a low elasticity modulus in another direction (represented by thin arrows) perpendicular to the first direction, as shown in FIG. 2C. In the first embodiment, the three anisotropic layers 20 are laminated to constitute the spring arm 5. Intermediate anisotropic layer 20c exhibits a high elasticity modulus in a direction identical to the center line C—C of the head suspension 11. The upper and lower anisotropic layers 20a and 20b between which the anisotropic material 20c is interposed exhibits a high elasticity modulus in a direction perpendicular to the direction in which the intermediate anisotropic layer 20c exhibits the high elasticity modulus. (the width direction of the head suspension 11).

If the anisotropic layers 20 which form the spring arm 5 are laminated as shown in FIG. 2C, the flexural rigidity of the spring arm 5 in the upward and downward direction is reduced, so that the rigidity which has an influence on the floating of the head slider 1 can be restricted. Furthermore, the internal flexural rigidity of the spring arm 5 is increased, and the resonance frequency of the head suspension 11 is increased.

Figure 3:
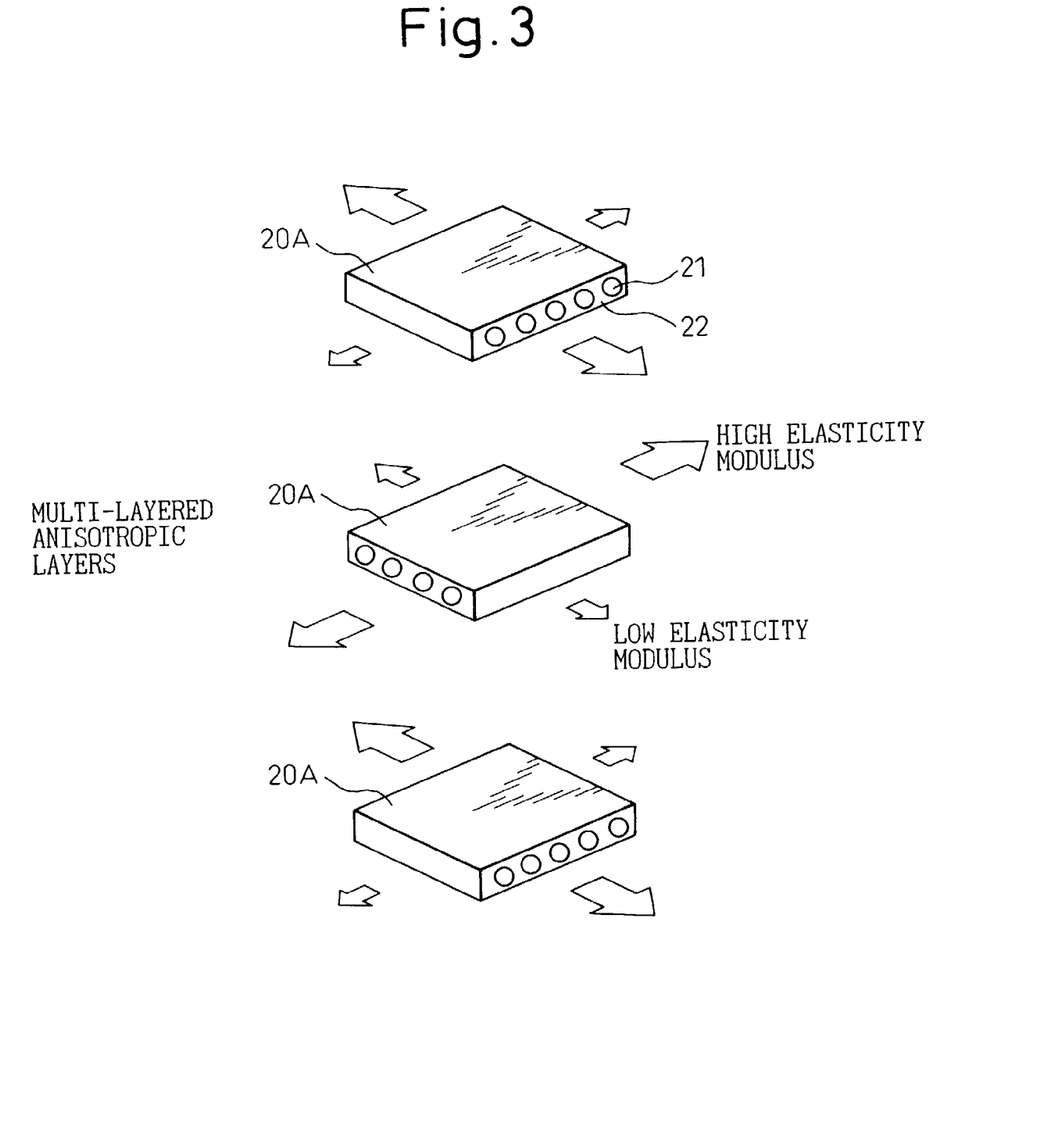
FIG. 3 is an exploded perspective view of the same part as FIG. 2C, showing orientations of carbon fibers when the anisotropic layers of the FIG. 2C are made of CFRP.

FIG. 3 shows an embodiment in which anisotropic layers 20A made of carbon fiber reinforced plastic (CFRP) are used instead of the anisotropic layers 20 shown in FIG. 2C. The anisotropic layers 20A are each in the form of a plate made of parallel carbon fibers 21 covered with a filler agent 22 such as resin. The direction in which it exhibits a high elasticity modulus extends along the carbon fibers. Therefore, in this embodiment, the anisotropic materials 20A are oriented, so that the carbon fibers 21 extend in directions in which the corresponding anisotropic layers 20A to 20C have high elasticity moduli.

As described above, the spring arm 5 is formed by a laminate structure in which the carbon fibers 21 of the adjacent upper and lower layers extend in orthogonal directions, and thus, the flexural rigidity direction of the head suspension 11 in the upward and downward direction is reduced and the rigidity which has an influence on the floating of the head slider 1 restricted. Furthermore, the internal flexural rigidity of the spring arm is increased, thus resulting in an increase of the resonance frequency of the head suspension 11.

Figure 4:
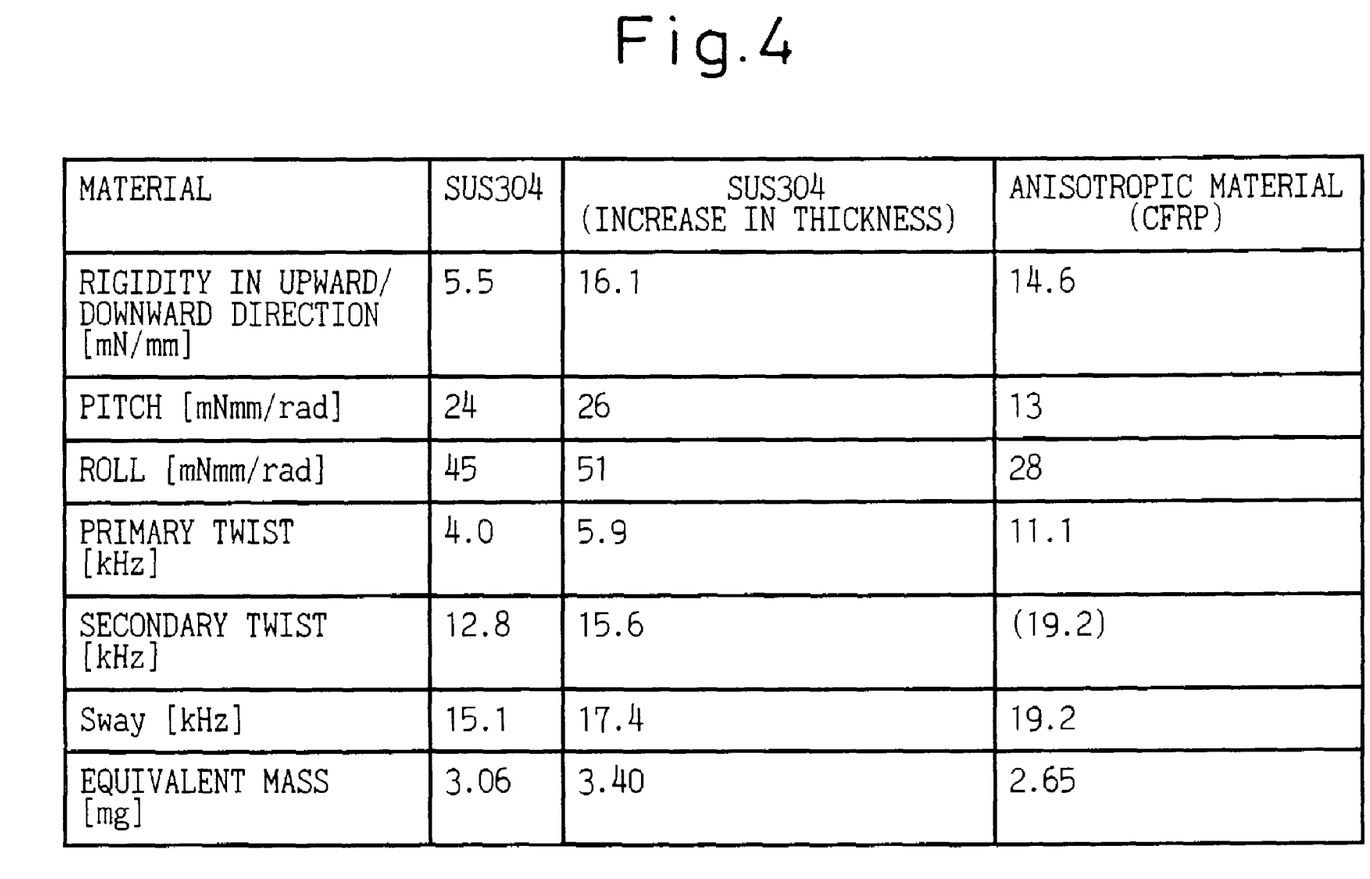
FIG. 4 is a table explaining an effect of a head suspension of the present invention.

FIG. 4 shows properties of the head suspension 11 made of the anisotropic layers 20A, in comparison with those of head suspension made of stainless steel (SUS) which has been conventionally used. As seen in FIG. 4, if the conventional SUS 304 (0.08C—18Cr—8Ni) is used, the resonance frequency is increased, but the rigidity is also increased. Further, the equivalent mass is also increased, and thus, a shock resistance is reduced. On the other hand, if the head suspension 11 is formed by the spring arm 5 which is made of laminated anisotropic layers 20A, as shown in FIG. 3, it is possible to increase the resonance frequency without increasing the rigidity of the head suspension 1. Moreover, the equivalent mass is reduced, and therefore, the shock resistance of the head suspension 11 can be improved.

Figure 5A:
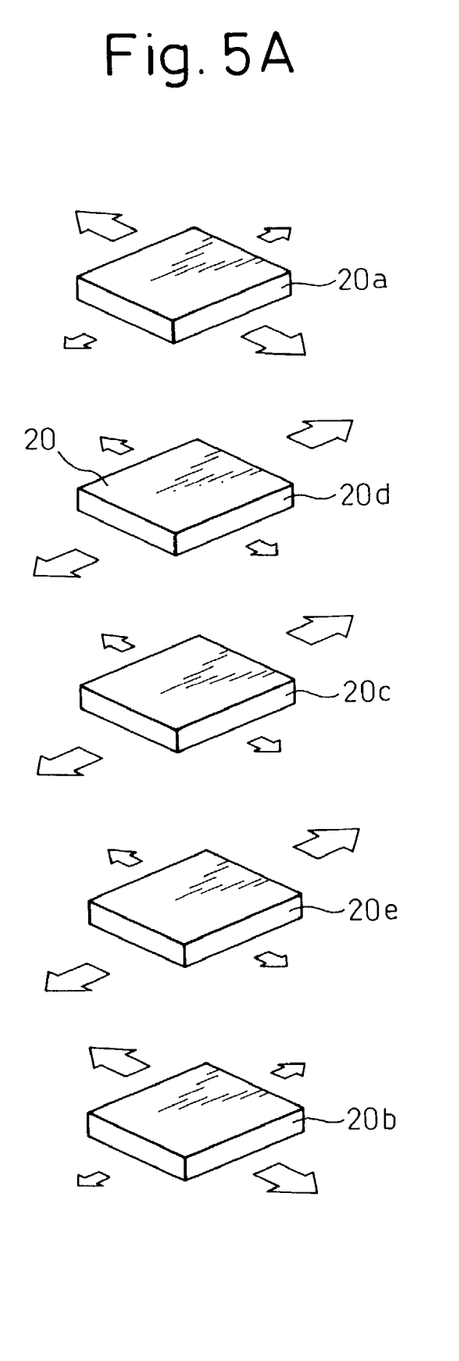
FIG. 5A is an exploded perspective view explaining orientations of anisotropic layers when the head suspension shown in FIG. 2A has a five-layer structure, by way of example.
Figure 5B:
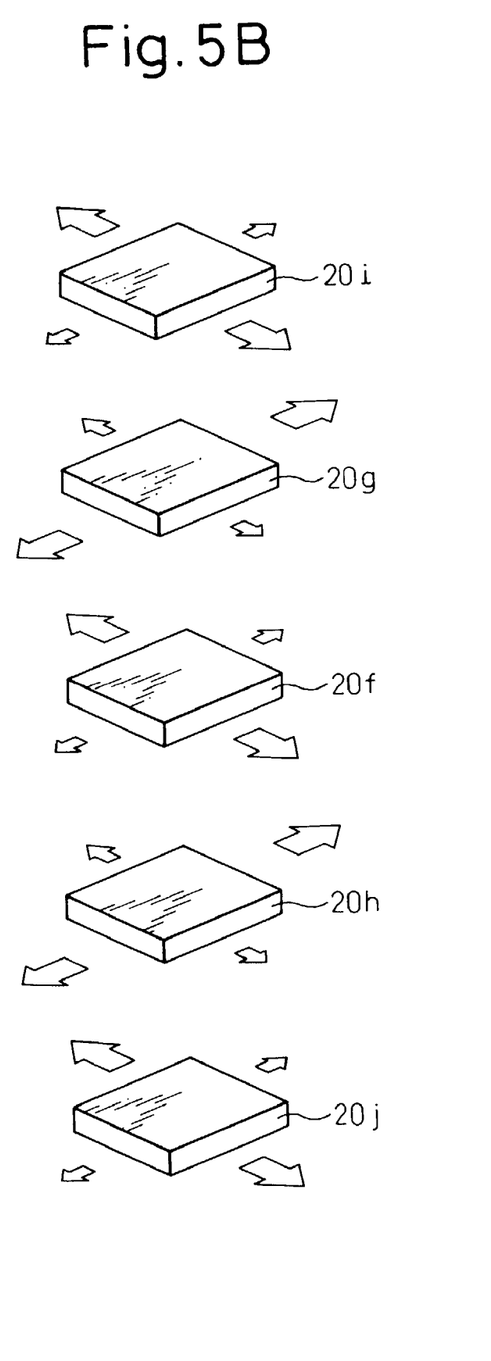
FIG. 5B is an exploded perspective view showing another example of orientations of anisotropic layers when the head suspension shown in FIG. 2A has a five-layer structure.

FIG. 5A and FIG. 5B shows two examples of orientations of the anisotropic layers 20 when the head suspension shown in FIG. 2 A is comprised of a spring arm 5 of five-layer structure. In an example of FIG. 5A, the anisotropic layers 20d and 20e are additionally interposed between the upper anisotropic layer 20a and the anisotropic layer 20c shown in FIG. 2C and between the lower anisotropic layer 20b and the anisotropic layer 20C, respectively. The anisotropic layers 20d, 20e exhibits the high elasticity modulus in a direction (identical to the direction of the anisotropic layer 20c and parallel with the center line of the head suspension 11) perpendicular to a direction in which the anisotropic layers 20a, 20b exhibit the high elasticity modulus.

To the contrary, in an example in FIG. 5B, the anisotropic layer 20f having a high elasticity modulus oriented in the width direction of the head suspension 11 is used as the middle layer of the five layers. Two upper anisotropic layers and two lower anisotropic layers 20g, 20h, 20i, 20j, are arranged as shown in the drawing, so that their higher elasticity modulus directions are alternatively orthogonal to each other. The example of FIG. 5 A can provide a higher resonance frequency than that of FIG. 5B, however, the example of FIG. 5B could be more advantageous in accordance with the usage.

Figure 6A:
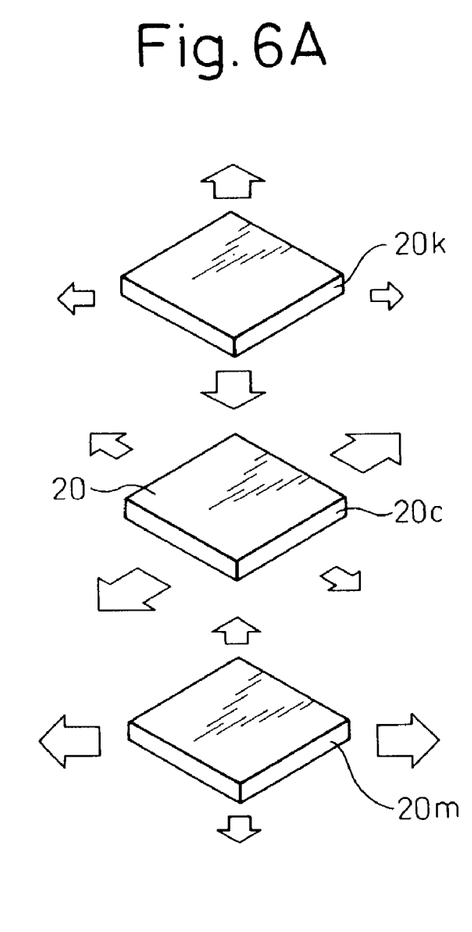
FIG. 6A is an exploded perspective view showing another example of orientations of anisotropic layers explained in FIG. 2C.

FIG. 6A shows another example of the orientations of the anisotropic material shown in FIG, 2 C. In this example, the high elasticity modulus direction of the intermediate anisotropic layer 20c is identical to the center line C—C of the head suspension 11 shown in FIG. 2A. The high elasticity modulus directions of the upper and lower anisotropic layers 20k and 20m between which the anisotropic layer 20c is interposed from 45° with respect to the high elasticity modulus direction of the anisotropic layer 20c. The high elasticity modulus directions of the anisotropic layers 20k and 20m are orthogonal to each other.

Figure 6B:
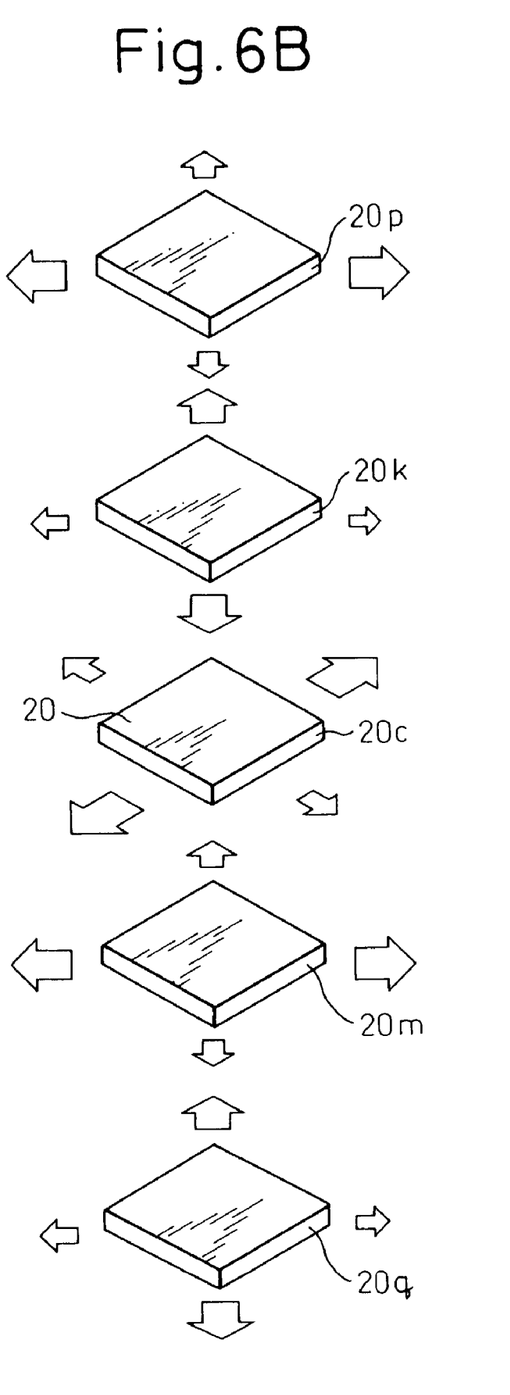
FIG. 6B is an exploded perspective view showing an example of orientations of anisotropic layers when the head suspension has a five-layer structure.

In an example of FIG. 6B, the outermost anisotropic layers 20p and 20q are respectively laminated on the upper and lower anisotropic layers 20k, 20m between which the anisotropic layer 20c shown in FIG. 6A is interposed. The high elasticity modulus directions of the anisotropic layers 20p and 20q are perpendicular to those of the anisotropic layers 20k and 20m, respectively. The anisotropic layers 20p and 20k can be replaced with the anisotropic layers 20m and 20q and vice versa. As can be seen from the foregoing, the high elasticity modulus directions of the anisotropic layers 20 in the present invention are not limited to the direction identical to the center line of the head suspension 11 and the direction perpendicular thereto.

Figure 7A:
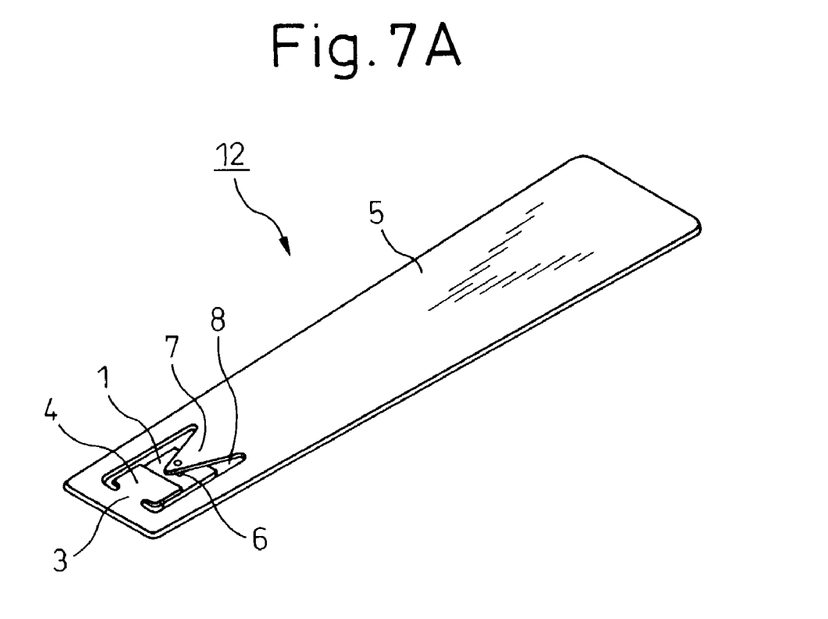
FIG. 7A is a perspective view of a head suspension structure of a second embodiment of the present invention in which a pivot is provided on the head suspension to press a head slider.

FIG. 7A shows a head suspension 12 of a second embodiment of the present invention. The second embodiment differs from the first embodiment in the point that a pivot 6 is provided on the tip end of the head suspension 5 explained with reference to the first embodiment, to press the head slider 1.

To provide the pivot 6 on the tip end of the head suspension 5, the portion of the slider attachment portion 4 opposite to the hinge 3 in the first embodiment is cut away. The substantially U-shaped hole 2, in the first embodiment, is replaced with a substantially W-shaped hole 8 due to a pivot holding portion 7 on which the pivot 6 is formed.

Figure 7B:
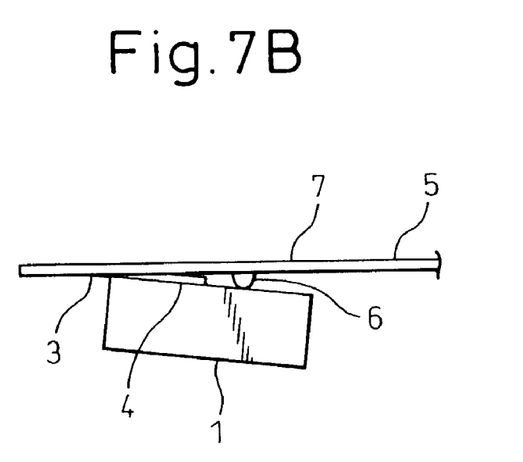
FIG. 7B is an enlarged partial view side of a tip end of the head suspension shown in FIG. 7A.

The pivot 6 is projected from the pivot holding portion 7 toward the head slider 1, as shown in FIG. 7B, to thereby press the back of the head slider 1, so that the head-provided side of the head slider 1 comes close to a magnetic recording medium. The head suspension 12 in the second embodiment can apply the pressing load to the back of the head slider 1, due to the pivot 6.

Figure 7C:
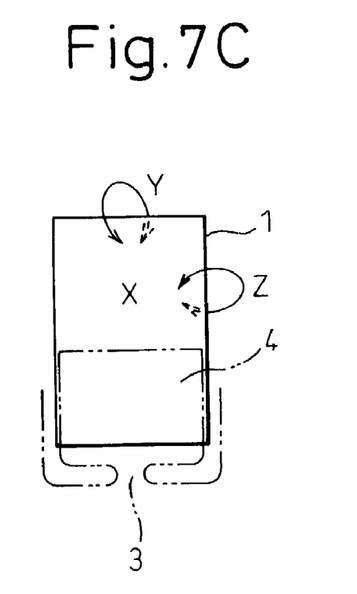
FIG. 7C is an explanatory view explaining a rotating direction of a head slider shown in FIG. 7A and FIG. 7B by the pivot.

FIG. 7C shows a back surface of the head slider 1, in which the portion to be pressed by the pivot 6 is indicated by X. Due to the pivot 6, the head slider 1 can rotate in directions indicated by Y and Z about the point X at which the force is applied by the pivot.

Figure 8A:
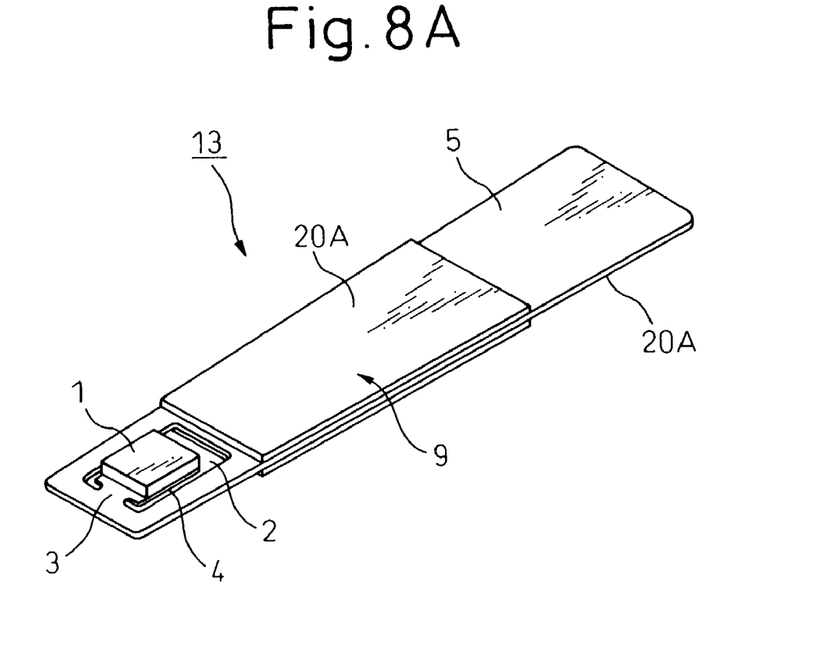
FIG. 8A is a perspective view showing a third embodiment of a head suspension of the present invention.

FIG. 8A shows a head suspension 13 of a third embodiment of the present invention. In the head suspension 13 of the third embodiment, a rigid body 9 is provided on a part of the head suspension 11 of the first embodiment. In the third embodiment, the spring arm 5 is comprised of four anisotropic layers 20A of CFRP. The rigid body 9 is made of one anisotropic layer 20A superimposed on each of the upper and lower surfaces of the spring arm 5.

Figure 8B:
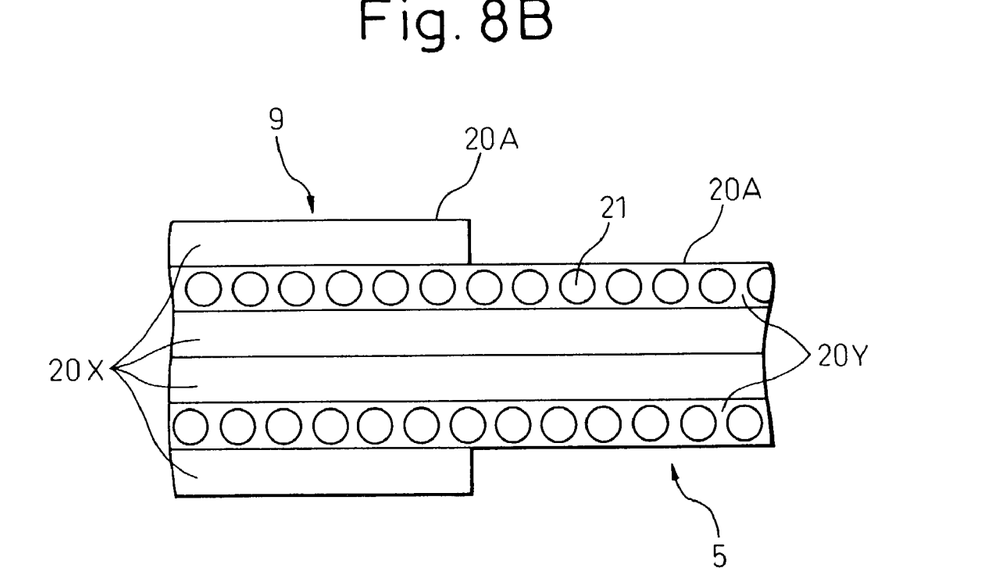
FIG. 8B is an enlarged partial view of a main part of FIG. 8A.

FIG. 8B shows an enlarged view of an end of the rigid body 9. In the spring arm 5 of the third embodiment, the two intermediate anisotropic layers 20X in which the carbon fibers 21 are oriented in the longitudinal direction of the head suspension 13 are used, and in the upper and lower anisotropic layers 20Y in which the carbon fibers 21 are oriented in a direction perpendicular to the longitudinal direction are used. The rigid body 9 is constructed by the anisotropic layers 20X that have the carbon fibers 21 oriented in the longitudinal direction and that are laminated in the upward and downward direction of the spring arm 5. Namely, the rigid body 9 is symmetric with respect to the spring arm 5 in the upward and downward direction.

Figure 9A:
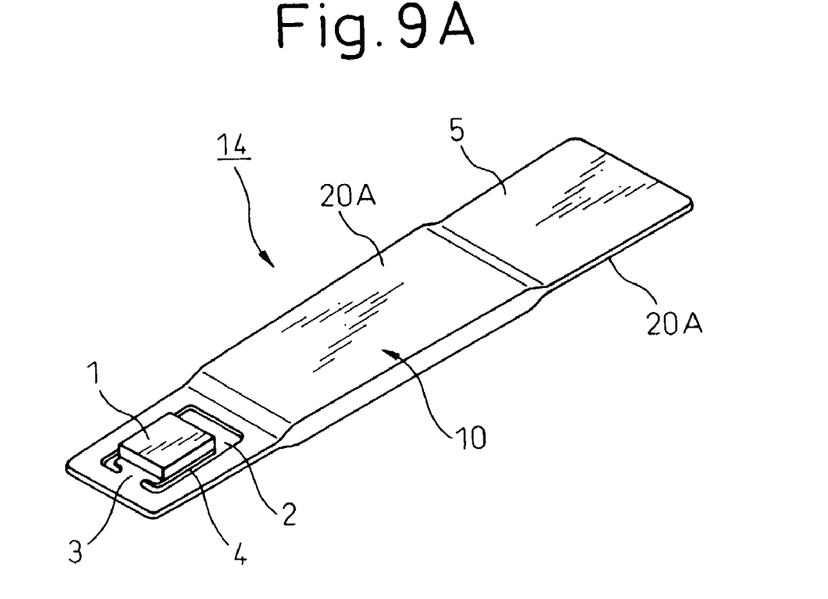
FIG. 9A is a perspective view showing a forth embodiment of a head suspension of the present invention.

FIG. 9A shows a head suspension 14 of a fourth embodiment of the present invention. In the head suspension 14 of the fourth embodiment, a rigid body 10 is provided on a part of the head suspension 11 of the first embodiment. In the fourth embodiment, the spring arm 5 is made of four anisotropic layers 20A of CFRP. The rigid body 9 is formed by inserting two the anisotropic layer 20A between the two intermediate layers of the spring arm 5.

Figure 9B:
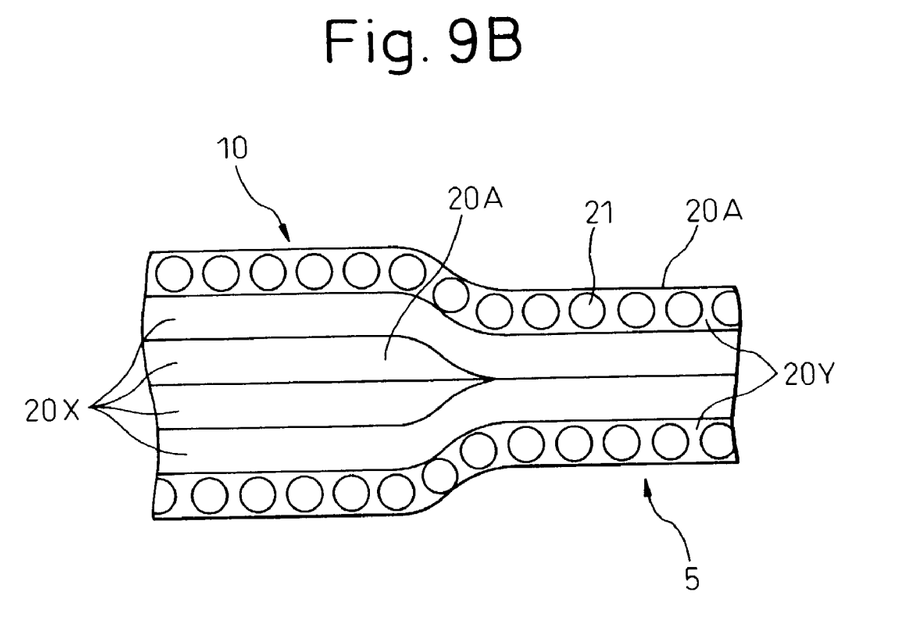
FIG. 9B is an enlarged partial view of a main part of FIG. 9A.

FIG. 9B is an enlarged view of tip end of the rigid body 10. In the spring arm 5 of the fourth embodiment, the two intermediate anisotropic layers 20X have carbon fibers 21 oriented in the longitudinal direction of the head suspension 13 and the upper and lower anisotropic layers 20Y have carbon fibers oriented in direction perpendicular to the longitudinal direction of the head suspension 13. The rigid body 10 is formed of the anisotropic layers 20X in which the carbon fibers 21 are oriented in the longitudinal direction of the head suspension 13 and which are interposed between the two intermediate layers 20X of the spring arm 5. Namely, the rigid body 10 is symmetric with respect to the spring arm 5 in the upward and downward direction.

Because the thickness of the anisotropic layers 20X, 20Y is very small, the rigid body 9 or 10 provided on the head suspension 13 or 14 hardly increases the weight of the head suspension 13 or 14.

In the above described embodiments, although the carbon fiber reinforce plastic is used as an anisotropic material, the kind of the anisotropic material is not limited thereto.

As explained above, in a head suspension of the present invention, since the anisotropic layers are laminated so that the external flexural rigidity of the head suspension is small and the internal flexural rigidity is large, if, for example, the anisotropic material such as CFRP is used, a three-layer structure in which a layer having carbon fibers oriented in the longitudinal direction of the suspension is interposed between layers having carbon fibers oriented in the width direction of the suspension can be obtained. Thus, a magnetic head suspension having a high shock-resistance and a high resonance frequency and a low rigidity having less influence on the floating can be provided, and this greatly contributes to an improvement in a magnetic disk apparatus.

What is claimed is:

1. A head suspension comprising:
   a data reading/writing head at tip end thereof, in an oscillation-type head actuator, in which at least a part of the head suspension is made of an anisotropic material having a first orientation of structural rigidity in a first direction, and at least a second orientation of structural rigidity in a second direction, the second structural rigidity being different from the first structural rigidity and the second direction being different from the first direction;
   a pivot provided in a vicinity of an attachment position of the head of the head suspension, the pivot pressing the head toward a recording medium to and from which data is written and read respectively;
   a hole provided at a tip end of the head suspension;
   a tongue piece projecting from the tip end into the hole, and attaching to the head; and
   a pressing piece projecting into the hole from an end of the head suspension opposite to the tongue piece, the pivot projecting from the pressing piece toward the head.

2. A head suspension according to claim 1, in which a portion of the head suspension has a greater thickness than a remaining portion to form a region of greater rigidity on the head suspension.

3. A head suspension having a data reading/writing head at tip end thereof, in an oscillation-type head actuator, in which at least a part of the head suspension is made of an anisotropic material having a first orientation of structural rigidity in a first direction, and at least a second orientation of structural rigidity in a second direction, the second structural rigidity being different from the first structural rigidity and the second direction being different from the first direction, wherein a portion of the head suspension has a greater thickness than a remaining portion to form a region of greater rigidity on the head suspension.

4. A head suspension according to claim 3, in which the portion forming the region of greater rigidity has a greater number of laminated anisotropic layers than the remaining portion.

5. A head suspension according to claim 4, wherein the portion forming the region of greater rigidity is formed by an anisotropic layer having an anisotropy oriented in a longitudinal direction of the head suspension.

6. A head suspension according to claim 4, wherein the portion forming the region of greater rigidity is formed by a core anisotropic layer having an anisotropy oriented in a longitudinal direction of the head suspension, said core anisotropic layer being interposed between at least two others of the plurality of anisotropic layers.

7. A head suspension according to claim 6, wherein the anisotropic material comprises a carbon fiber reinforced resin having a structural rigidity oriented in a direction in which carbon fibers in the resin extend.

8. A head suspension according to claim 4, wherein a relative thickness of the region of greater rigidity above and below the head suspension is substantially equal with respect to a central layer of the head suspension, or with respect to a central plane between two equally central ones of the plurality of layers.

9. A head suspension according to claim 3, wherein a relative thickness of the region of greater rigidity above and below the head suspension is substantially equal with respect to a central layer of the head suspension, or with respect to a central plane between two equally central ones of the plurality of layers.

10. A head suspension according to claim 9, wherein the portion forming the region of greater rigidity is formed by an anisotropic layer having an anisotropy oriented in a longitudinal direction of the head suspension.

11. A head suspension according to claim 9, wherein the portion forming the region of greater rigidity is formed by a core anisotropic layer having an anisotropy oriented in a longitudinal direction of the head suspension, said core anisotropic layer being interposed between at least two others of the plurality of anisotropic layers.

12. A head suspension having a data reading/writing head at tip end thereof, in an oscillation-type head actuator, in which at least a part of the head suspension is made of an anisotropic material having a first orientation of structural rigidity in a first direction, and at least a second orientation of structural rigidity in a second direction, the second structural rigidity being different from the first structural rigidity and the second direction being different from the first direction,
   wherein the anisotropic material forms a laminate structure of a plurality of anisotropic layers, each of the plurality of layers having an orientation of structural rigidity in a direction different than that of one other of the plurality of layers,
   wherein each of said plurality of layers exhibits a high orientation of rigidity in at least one direction, and
   wherein a flexural rigidity in movement directions of the head to and from a recording medium is small, and the flexural rigidity within planes of the plurality of layers generally perpendicular to the movement directions is large.

13. A head suspension according to claim 12, wherein the plurality of anisotropic layers are laminated so that respective anisotropies of individual ones of the plurality are oriented in either of a longitudinal direction or a width direction of the head suspension.

14. A head suspension according to claim 13, wherein consecutive ones of the plurality of laminated layers have alternatively different orientations of anisotropy.

* * * * *